United States Patent
Hundenborn et al.

(10) Patent No.: US 12,089,730 B2
(45) Date of Patent: Sep. 17, 2024

(54) ORAL CARE INSTRUMENT

(71) Applicant: M+C Schiffer GmbH, Neustadt/Wied (DE)

(72) Inventors: Maik Hundenborn, Bonn (DE); Bernhard Josef Schmidt, Pleckhausen (DE); Rebecca Mühle, Ransbach-Baumbach (DE)

(73) Assignee: M+C Schiffer GmbH, Neustadt/Wied (DE)

( * ) Notice: Subject to any disclaimer, the term of this patent is extended or adjusted under 35 U.S.C. 154(b) by 471 days.

(21) Appl. No.: 17/602,104

(22) PCT Filed: Mar. 23, 2020

(86) PCT No.: PCT/EP2020/057996
§ 371 (c)(1),
(2) Date: Oct. 7, 2021

(87) PCT Pub. No.: WO2020/207778
PCT Pub. Date: Oct. 15, 2020

(65) Prior Publication Data
US 2022/0211169 A1 Jul. 7, 2022

(30) Foreign Application Priority Data

Apr. 9, 2019 (DE) .................... 10 2019 205 055.7

(51) Int. Cl.
*A46D 3/00* (2006.01)
*A46B 3/04* (2006.01)
*A46B 9/04* (2006.01)
*A46D 1/00* (2006.01)
*B29L 31/42* (2006.01)

(52) U.S. Cl.
CPC .................. *A46D 3/00* (2013.01); *A46B 3/04* (2013.01); *A46B 9/04* (2013.01); *A46D 1/006* (2013.01); *A46D 1/0207* (2013.01); *A46B 2200/1066* (2013.01); *B29L 2031/425* (2013.01)

(58) Field of Classification Search
CPC ........ A46D 3/00; A46D 1/006; A46D 1/0207; A46B 3/04; A46B 9/04; A46B 2200/1066; B29L 2031/425
See application file for complete search history.

(56) References Cited

U.S. PATENT DOCUMENTS

| | | | |
|---|---|---|---|
| 2004/0134007 A1* | 7/2004 | Davies ............... | A46B 15/0081 15/167.1 |
| 2005/0166344 A1* | 8/2005 | Hohlbein .......... | A46B 15/0081 15/187 |
| 2014/0082867 A1* | 3/2014 | Zettel .................... | A61Q 11/00 15/104.93 |
| 2017/0245628 A1* | 8/2017 | Xi ........................ | A46D 1/0276 |
| 2018/0042373 A1* | 2/2018 | Wong ...................... | A46B 9/06 |
| 2018/0055207 A1* | 3/2018 | Hohlbein ............... | A46B 9/028 |
| 2018/0317640 A1* | 11/2018 | Schär .................. | B29C 45/2626 |
| 2019/0159582 A1* | 5/2019 | Pillai .................. | A46B 15/0085 |
| 2020/0146431 A1* | 5/2020 | Davies-Smith .......... | A61K 8/22 |
| 2020/0163446 A1* | 5/2020 | Strotman ................. | A61K 8/91 |
| 2020/0163449 A1* | 5/2020 | Strotman ................. | A61K 8/24 |

FOREIGN PATENT DOCUMENTS

| | | | | |
|---|---|---|---|---|
| CN | 108685316 A | * | 10/2018 | |
| DE | 112013004903 T5 | | 7/2015 | |
| EP | 1859705 A1 | | 11/2007 | |
| EP | 3598920 A1 | * | 1/2020 | ......... A46B 15/0085 |
| GB | 2391462 A | * | 2/2004 | ......... A46B 15/0055 |
| JP | H0994886 A | * | 4/1997 | |
| KR | 1020000024117 A | | 5/2000 | |
| KR | 100784183 B1 | * | 12/2007 | |
| KR | 20100007852 U | * | 8/2010 | |
| KR | 20100112664 A | * | 10/2010 | |
| KR | 101722691 B1 | * | 4/2017 | |
| WO | WO-2015085536 A1 | * | 6/2015 | ......... A46B 11/0003 |
| WO | 2017076839 A1 | | 5/2017 | |

* cited by examiner

*Primary Examiner* — Marc Carlson
(74) *Attorney, Agent, or Firm* — The Webb Law Firm

(57) ABSTRACT

The invention relates to an oral care instrument, in particular a toothbrush or a tongue cleaner, including at least one cleaning element made from a first plastic component, wherein the first plastic component contains a thermoplastic elastomer and activated carbon. The invention also relates to a method for producing an oral care instrument, in particular a toothbrush or a tongue cleaner, including the following steps: a) providing a first plastic component by adding activated carbon to a thermoplastic elastomer, and b) producing a cleaning element from the first plastic component using an injection molding method.

13 Claims, No Drawings

ORAL CARE INSTRUMENT

CROSS-REFERENCE TO RELATED APPLICATIONS

This application is the United States national phase of International Application No. PCT/EP2020/057996 filed Mar. 23, 2020, and claims priority to German Patent Application No. 10 2019 205 055.7 filed Apr. 9, 2019, the disclosures of each of which are hereby incorporated by reference in their entireties.

BACKGROUND OF THE INVENTION

Field of the Invention

The present invention relates to an oral care instrument, in particular a toothbrush or a tongue cleaner and a method for producing the same.

Description of Related Art

In addition to cleaning the teeth, oral care also includes regular cleaning of the oral mucosa and the surface of the tongue. Cleaning the surface of the tongue is of particular importance. All people have a tongue coating consisting of dead cells, blood components, saliva components, food residues and microorganisms. Due to the surface structure of the tongue, this coating finds a good grip on the tongue surface. It is known that the microorganisms contained in the tongue coating in particular play a significant role in the development of bad breath. Thus, the amount of tongue coating often correlates with the development of bad breath. Regular mechanical removal of the tongue coating is therefore a suitable means of preventing bad breath.

For removing tongue coating, it is known to use oral care instruments with special cleaning elements usually made of soft-elastic thermoplastic elastomers. Unlike the bristles of a toothbrush, which are made of relatively hard plastic fibers, these cleaning elements allow gentle cleaning of the tongue and oral mucosa without damaging them. Thermoplastic elastomers, such as styrene block copolymers, are used to manufacture these cleaning elements. Known oral care instruments for cleaning the oral mucosa and the surface of the tongue can be configured as tongue scrapers, which only have cleaning elements made of the above mentioned plastic material, or as toothbrushes, which have both the above mentioned cleaning elements and bristles for cleaning the teeth.

A toothbrush with cleaning elements made of soft elastic plastic is disclosed, for example, in US 2005/0166344 A1. This document shows a toothbrush with an elongated handle, which serves as a grip, and a brush head connected thereto, on one side of which a bristle field is arranged for cleaning the teeth. On the side of the brush head facing away from the bristle field, the toothbrush has a plurality of nub-shaped cleaning elements made of a soft-elastic plastic material, which are used to clean the tongue. These cleaning elements are intended to prevent the development of bad breath.

Moreover, cleaning elements made of soft elastic plastic are also known, for example, from EP 1 859 705 A1. This discloses a toothbrush with a basic brush head body made of plastic, on one side of which bristle bundles are fixed. By partially overmolding the brush head body with a soft-elastic plastic component, lamellar cleaning elements are formed which run parallel to the longitudinal direction of the bristle bundles and protrude from the brush head on the same side as the bristle bundles. These cleaning elements serve, among other things, to further protect the oral mucosa.

SUMMARY OF THE INVENTION

The object of the present invention is to provide an improved oral care instrument with which the development of bad breath can be effectively prevented.

In order to solve this problem, the present invention provides an oral care instrument, in particular a toothbrush or a tongue cleaner, with at least one cleaning element made of a first plastic component, wherein the first plastic component contains a thermoplastic elastomer and activated carbon.

DETAILED DESCRIPTION

The present invention is based on the finding that the admixture of activated carbon to the plastic material of the cleaning element leads to a reduction in bad breath and improved cleaning of the oral mucosa and tongue surface. In particular, the activated carbon enables bad odors, such as those produced by bacteria, debris and saliva flow, to be absorbed.

The cleaning element is made from a first plastic component which contains at least one thermoplastic elastomer. Suitable thermoplastic elastomers for the production of such cleaning elements are known to the skilled person. In general, the skilled person understands the term thermoplastic elastomers to mean plastics which behave elastically at room temperature, however, can be plastically deformed when heat is supplied. Thus, thermoplastic elastomers are particularly suitable for use in injection molding methods. Accordingly, the cleaning element according to the invention is preferably injection molded. In this way, the cleaning element can be produced in different shapes by known injection molding methods. Due to its elastic properties, the thermoplastic elastomer is also suitable for gentle cleaning of the oral mucosa or the tongue surface without the risk of external injury to the tissue.

Suitable thermoplastic elastomers for the first plastic component are in particular styrene copolymers, such as styrene-ethylene-butylene copolymers, styrene-butylene copolymers, styrene-ethylene-propylene copolymers or styrene-isoprene copolymers. Particularly preferred are block copolymers, such as styrene/butadiene block copolymer (SBS), styrene/isoprene block copolymer (SIS), styrene/ethylene butene/styrene block copolymer (SEBS) and styrene/ethylene propene/styrene block copolymer (SEPS). The first plastic component may also include a blend of thermoplastic elastomers.

Preferably, the first plastic component has soft elastic properties to prevent injury to the oral mucosa or tongue surface. Thus, the first plastic component preferably has a Shore hardness of 1 to 70 Shore-A, more preferably 5 to 40 Shore-A, most preferably 10 to 30 Shore-A, measured according to DIN ISO 7619-1:2012.

Since the hardness of the first plastic component is significantly influenced by the properties of the thermoplastic elastomer, the thermoplastic elastomer preferably also has a Shore hardness of 1 to 70 Shore-A, particularly preferably 5 to 40 Shore-A, most preferably 10 to 30 Shore-A measured according to DIN ISO 7619-1:2012.

The shape of the cleaning element can be adapted to achieve an optimum cleaning effect. For example, the cleaning element can have nub-, rod- or lamella-shaped protrusions. The protrusions preferably have a length of 0.1 to 20 mm, particularly preferably 0.2 to 15 mm, most preferably 0.5 to 10 mm.

In one embodiment, the oral care instrument comprises a head portion and a shaft portion. At least one cleaning element is arranged on the head portion in this embodiment.

The shaft portion can be formed, in particular, as a handle. However, the shaft portion can also be formed in the shape of an adapter that enables the oral care instrument to be connected to a separate grip. For example, the oral care instrument can be connected to the handle portion of an electric toothbrush in this manner.

The head portion is preferably formed such that it enables handling of the oral care instrument in the oral cavity. In particular, the head portion is dimensioned such that it can be inserted into the space between the cheek teeth and the buccal mucosa.

In one embodiment, the oral care instrument has a base body that forms the head portion and the shaft portion. The base body consists of a second plastic component. The second plastic component is preferably made of a harder plastic than the first plastic component. The Shore hardness of the second plastic component is preferably 30 to 100 Shore D, particularly preferably 40 to 80 Shore D, most preferably 50 to 80 Shore D measured according to DIN ISO 7619-1:2012. A suitable plastic for producing the base body is, for example, polypropylene.

The base body is preferably at least partially overmolded with the first plastic component. Not only the head portion can be overmolded to form the cleaning element, but also areas of the shaft portion. In this way, for example, grip surfaces can be formed from the first plastic component. The base body can be overmolded with the first plastic component from a single injection point so that a continuous area is formed from the first plastic component. Alternatively, several injection points can be used so that separate areas are formed from the first plastic component. In a preferred embodiment, the oral care instrument is a toothbrush, wherein the head portion has one or more bristle bundles for tooth cleaning in addition to the cleaning element. The bristle bundles preferably comprise extruded plastic fibers, for example polyamide fibers. Preferably, these bristle bundles are arranged substantially parallel to each other and protrude together towards one side of the head portion. The bristle bundles thus arranged form a bristle field. The individual bristle bundles of a bristle field can differ, for example, in terms of their length and degree of hardness. Bristle bundles that are arranged essentially parallel are understood by the skilled person to include not only bristle bundles that are arranged exactly parallel, but also bristle bundles that run at an angle to one another, provided that the longitudinal axes of the bristle bundles are at an angle of no more than 30°, preferably no more than 20°, and particularly preferably no more than 10° to one another.

In one embodiment, at least one cleaning element is arranged on a side of the head portion facing away from the bristle bundles. This has the advantage that the side of the head portion provided with the bristle bundles can be used for cleaning the teeth, while the cleaning element arranged on the opposite side of the head portion is used for cleaning the tongue, for example.

Alternatively or additionally, at least one cleaning element is arranged on the same side of the head portion as the bristle bundles. Preferably, the longitudinal direction of the cleaning element is arranged substantially parallel to the longitudinal direction of the bristle bundles. Preferably, the angle between the longitudinal direction of the cleaning element and the longitudinal direction of the bristle bundles is not more than 30°, particularly preferably not more than 20°, most preferably not more than 10°.

Cleaning elements on the side of the head portion facing away from the bristle bundles can, for example, be rod-shaped, lamellar or nub-shaped. The cleaning element can preferably project from the head portion over a length of 0.1 to 10, particularly preferably 0.2 to 5, most preferably 0.5 to 3 mm.

A cleaning element arranged on the same side of the head portion as the bristle bundles is preferably rod- or lamella-shaped. The length of this cleaning element is preferably 1 to 20 mm, particularly preferably 5 to 15 mm, most preferably 8 to 12 mm.

In order to prevent bad breath, the first plastic component contains activated carbon. Preferably, the proportion of activated carbon in the first plastic component is 1 to 50% by weight, particularly preferably 5 to 30% by weight, most preferably 10 to 20% by weight.

The activated carbon is preferably in powder form and has a preferred mean grain diameter of 200 μm or less, particularly preferably 100 μm or less, most preferably 75 μm or less. For example, the mean grain diameter of the activated carbon is 5 to 200 μm, more preferably 10 to 100 μm, most preferably 20 to 75 μm.

In order to achieve a particularly effective reduction of bad breath, an activated carbon with a large inner surface is preferably used. A measure of the internal surface of the activated carbon is, for example, the iodine value measured according to ASTM D 4607 and/or the BET surface measured according to DIN ISO 9277:2003-05. Preferably, the activated carbon has an iodine value of at least 400 mg/g, preferably at least 600 mg/g, most preferably at least 900 mg/g measured according to ASTM D 4607 and/or a BET surface of at least 300 m$^2$/g, preferably 300 to 2000 m$^2$/g, most preferably 800 to 1200 m$^2$/g measured according to DIN ISO 9277:2003-05. Improved reduction of bad breath can also be achieved by the first plastic component containing, in addition to the thermoplastic elastomer and the activated carbon, further additives which increase the pore size of the thermoplastic elastomer and thus improve the incorporation of the activated carbon. One possible additive is chalk (calcium carbonate). In a preferred embodiment, the first plastic component therefore comprises chalk in an amount of preferably 1 to 50% by weight, most preferably 2 to 35% by weight, most preferably 5 to 25% by weight. Preferably, the first plastic component comprises powdered chalk with an average grain diameter of less than 200 μm, preferably less than 100 μm, most preferably less than 50 μm.

The addition of chalk loosens up the plastic component and is a particularly effective means of increasing pore size. The open porosity achieved by chalk enhances the effect of the activated carbon and thus improves odor reduction. As a rule, the pore enlargement associated with the addition of chalk results in an opaque appearance of the plastic component.

The addition of activated carbon gives the first plastic component a black color. The color of the first plastic component can be influenced by the amount of activated carbon added and by the addition of pigments.

In addition, the present invention relates to a method for producing an oral care instrument, in particular a toothbrush or a tongue cleaner, wherein the method comprises the following steps:

a) providing a first plastic component by adding activated carbon to a thermoplastic elastomer, b) producing a cleaning element from the first plastic component by an injection molding method.

Providing the first plastic component is preferably done by melting the thermoplastic elastomer and adding the activated carbon to the plastic melt thus obtained. Preferably, the plastic melt produced in this way is further processed directly by an injection molding method following the addition of the activated carbon in order to obtain the cleaning element. Alternatively, the plastic melt can first be cooled and then remelted for use in the injection molding method of step b).

In a preferred embodiment, step b) comprises the following steps:
- b1) producing a base body with a head portion and a shaft portion from a second plastic component by an injection molding method,
- b2) producing the cleaning element from the first plastic component by at least partial overmolding of the head portion with the first plastic component.

In this way, a base body can be made from a second, relatively hard and thus mechanically resistant plastic component, the surface of which is partially overmolded with the relatively soft first plastic component.

The invention claimed is:

1. An oral care instrument comprising at least one cleaning element made of a first plastic component, wherein the first plastic component comprises a thermoplastic elastomer, 1 to 50% by weight of activated carbon and 1 to 35% by weight of chalk, and wherein the first plastic component having a Shore hardness of 1 to 50 Shore-A measured according to DIN ISO 7619-1:2012.

2. The oral care instrument according to claim 1, wherein the cleaning element is injection-molded.

3. The oral care instrument according to claim 1, wherein the cleaning element has nub-, rod- or lamella-shaped protrusions.

4. The oral care instrument according to claim 1, wherein the oral care instrument comprises a head portion and a shaft portion, and at least one cleaning element is arranged at the head portion.

5. The oral care instrument according to claim 1, wherein the oral care instrument comprises a base body consisting of a second plastic component having a head portion and a shaft portion.

6. The oral care instrument according to claim 5, wherein the head portion comprises, in addition to the cleaning element, one or more bristle bundles for tooth cleaning.

7. The oral care instrument according to claim 6, wherein at least one cleaning element is arranged on a side of the head portion facing away from the bristle bundles.

8. The oral care instrument according to claim 6, wherein at least one cleaning element is arranged on the same side of the head portion as the bristle bundles.

9. The oral care instrument according to claim 1, wherein the activated carbon has an mean grain diameter of 200 μm or less.

10. The oral care instrument according to claim 1, wherein the oral care instrument is a toothbrush or a tongue cleaner.

11. A method for producing an oral care instrument, comprising the steps:
- a) providing a first plastic component by adding activated carbon to a thermoplastic elastomer wherein the first plastic component has a Shore hardness of 1 to 50 Shore-A measured according to DIN ISO 7619-1:2012, and wherein the first plastic component comprises 1 to 50% by weight of activated carbon and 1 to 35% by weight of chalk, and
- b) producing a cleaning element from the first plastic component by an injection molding method.

12. The method according to claim 11, wherein step b) comprises the following steps:
- b1) producing a base body with a head portion and a shaft portion from a second plastic component by an injection molding method, and
- b2) producing the cleaning element from the first plastic component by at least partial overmolding of the head portion with the first plastic component.

13. The method according to claim 11, wherein the oral care instrument is a toothbrush or a tongue cleaner.

* * * * *